Patented June 29, 1948

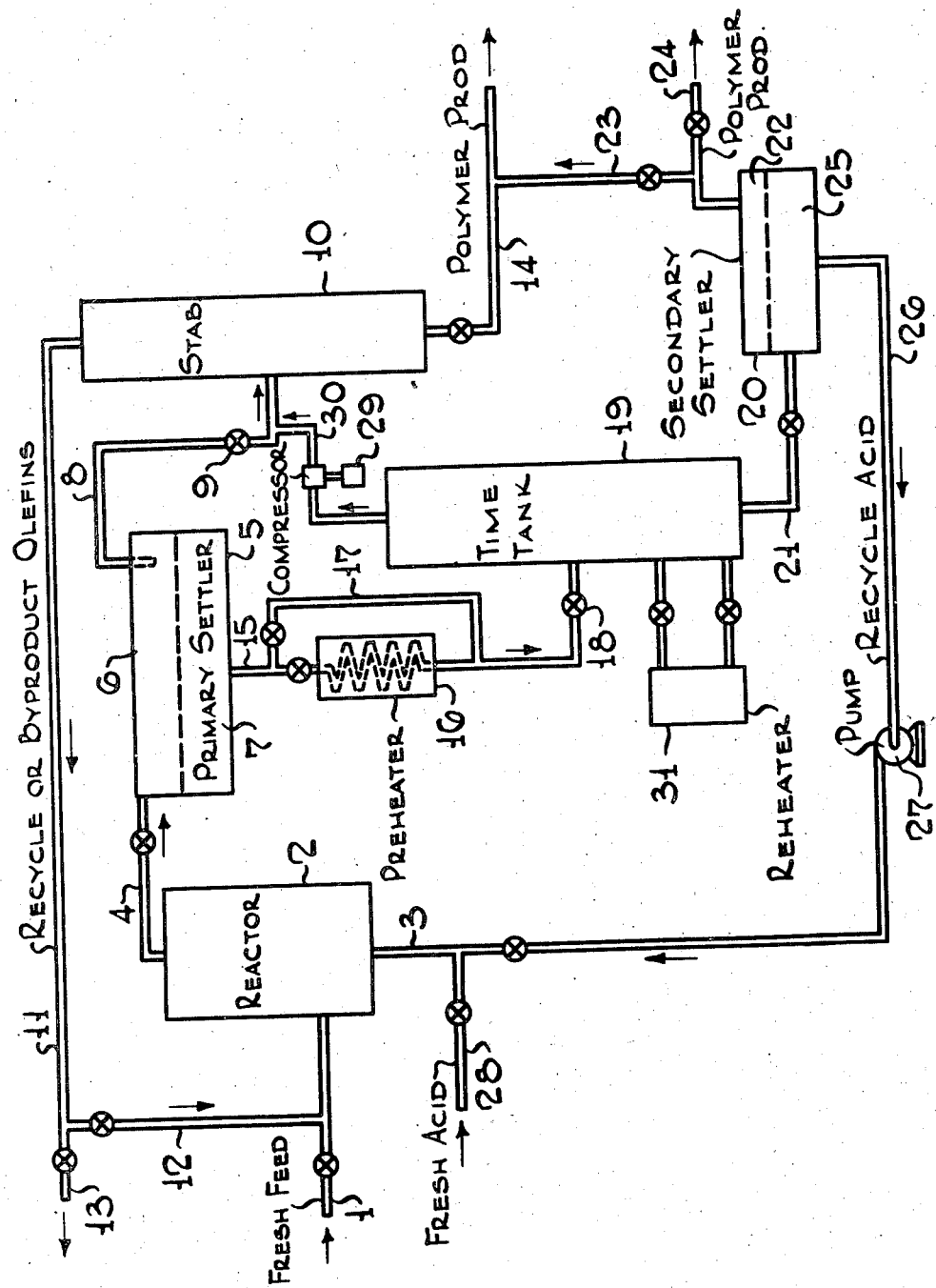

2,444,057

UNITED STATES PATENT OFFICE 2,444,057

POLYMERIZATION PROCESS

Robert V. J. McGee, Elizabeth, N. J., assignor to Standard Oil Development Company, a corporation of Delaware Application January 19, 1946, Serial No. 642,395

2 Claims. (Cl. 260—683.15)

This invention relates to the art of polymerizing gaseous olefins, such as butenes with a sulfuric acid catalyst to form motor fuel hydrocarbons. It is particularly concerned with improved steps in a treatment of the spent acid catalyst from the polymerization process to facilitate reuse of the acid and yield additional polymer byproducts of value.

In known processes developed for polymerization of normally gaseous olefins, most commonly isobutene alone, and in mixtures with normal butenes, and in some instances mixtures containing $C_3$ and $C_5$ olefins, sulfuric acid of about 55% to 70% strength has generally been used. In producing certain higher polymers such as trimers, higher acid strengths of about 70% to 85% have been used. In the processes wherein 55% to 70% strength acid is used, the olefins are chiefly polymerized to dimers and codimers boiling mainly in the range of 200° F. to 300° F. and the preferred polymerization temperatures are in the range of 140° F. to about 212° F. Following the polymerization of the olefins in a reaction zone with proper strength of acid, provisions have been made generally to separate the polymer product from the acid catalyst and for reclaiming the separated acid catalyst, which at this stage is spent or degraded by loss of strength so that it cannot be reused as a catalyst without first being concentrated back to proper strength.

A typical method employed hitherto for reclaiming the spent acid catalyst from a sulfuric acid polymerization of olefins involved dilution with water to desorb unpolymerized olefins remaining in the acid followed by evaporation of water, cooking of the acid at elevated temperatures to carbonize residual organic substances, and removal of the carbonized substances. It can be readily seen that such a procedure is complicated and wasteful.

An object of this invention is to make recovery of the acid from spent catalyst more expeditious and economical by providing a treatment which makes part of the olefins present in the spent catalyst form additional polymers while another part of the olefin is desorbed.

A preferred method of treatment made in accordance with the present invention will be described with reference to the accompanying flow diagram.

In the drawing the flow diagram shows schematically in combination a primary polymerization reactor and an acid recovery unit.

Referring to the flow plan diagram, an olefin feed, such as a refinery $C_4$ cut, is passed from supply inlet 1 to polymerization reactor 2, wherein the olefins are reacted with sulfuric acid catalyst charged from line 3. With the acid at proper strength of about 55% to 70% and at a suitable reaction temperature of about 140° F. to 212° F., the olefins maintained in liquid phase at a pressure above 40 pounds per square inch absolute are polymerized to yield desired liquid hydrocarbon polymers boiling above 200° F. Usually, the pressure required in reactor 2 is of the order of 100 pounds to 250 pounds per square inch absolute with reaction temperatures above 140° F. for maximum yields of dimer. With an optimum acid strength of between 70% and 80% for high yields of trimer, the temperature is more suitably in the range of 35° F. and 140° F. and the pressure may then be in the range of 40 to about 100 pounds per square inch absolute.

At the end of the polymerization reaction, the reaction mixture containing the polymer products and spent acid catalyst is passed through line 4 from reactor 2 into a primary settler 5, where polymer oil separates as an upper layer 6 from the lower layer 7 of spent acid.

The polymer oil is passed through line 8 through a pressure release valve 9 into a stabilizer 10, where released gaseous olefins pass overhead into line 11. From line 11, the gaseous olefins may be returned to the reactor 2 through recycle line 12 or be sent to storage by line 13. Polymers forming the stabilizer bottoms are withdrawn from stabilizer 10 through line 14 to storage.

Spent acid, which also contains absorbed olefins left unpolymerized, is released from the bottom of primary settler 5 through line 15 to be passed through a preheater 16 in part or whole, or alternatively be led through valved by-pass line 17 for discharge through pressure release valve 18 into a time tank 19 for treatment of the spent acid catalyst.

In tank 19, the spent acid catalyst containing absorbed olefins is subjected under lowered pressure, below 40 pounds per square inch and preferably about 0 to about 15 pounds per square inch absolute, to a temperature of about 100° F. to 190° F. Under these conditions, preferably with suitable agitation or circulation, a portion of the olefins is desorbed from the acid while the remaining portion of the olefins absorbed in the acid is polymerized. During the treatment in the time tank 19 the acid may be circulated through a reheater 31 to maintain the desired temperature of treatment and increase circulation. The time tank 19 may be in the form of a packed tower to further increase mixing of spent catalyst charged into a middle section of the tower through pressure release valve 18.

The treated spent acid is withdrawn from the time tank 19 to a secondary settler 20 through line 21. In the secondary settler 20 additionally-formed polymer from the spent catalyst treatment separates as an upper layer 22, and this polymer oil may be led through line 23 for addition to polymer oil withdrawn as bottoms from stabilizer 10 through line 14 or may be passed by line 24 to storage. The treated acid separated as a layer 25 from the polymer oil formed in the time tank 19 is withdrawn from secondary settler 20 through line 26 to be recycled by pump 27 to the reactor catalyst supply line 3. Fresh makeup acid is added to the recycled acid through line 28 as required.

Gaseous olefins liberated in tank 19 are evacuated by compressor 29 and forced thereby through line 30 into stabilizer 10 for admixture with olefins liberated from the polymer oil in the same stabilizer.

The procedure described may be used in recovering spent acid from a selective polymerization of isobutene but is more advantageously used in a hot acid polymerization of mixed olefins, such as mixtures of normal butenes and isobutenes.

In a hot acid polymerization of mixed olefins, a substantial amount of unpolymerized olefins remains absorbed in the spent acid catalyst and causes the titratable acidity of the catalyst to drop off rapidly until a point is reached at which the lower acidity tends toward alcohol formation and low yields of desired polymer. The condition of rapid loss of acidity gives rise to high acid consumption in maintaining proper acid strength in the production of polymers. For example, data establish that good yields of butene codimers are obtained when the acid strength is maintained above 55% and preferably from 60% to 70% for reaction temperature of above 140° F. When the acidity of the catalyst drops to about 55% and lower, the yields drop rapidly.

When a spent catalyst of between about 50% and 60% titratable acidity, after being separated from polymers formed in the liquid phase, is heated at lowered pressures, e. g., about atmospheric pressure, to a temperature above 140° F., butenes in part become liberated from the acid while part of the butenes in the acid undergoes polymerization. The polymer yielded during this low pressure treatment of the spent acid at about 160° F. contains about 50% $C_8$ polymers and about 35% of $C_{12}$ polymers, the latter being particularly useful as components of safety fuels. Other polymers formed are intermediate and heavier. The recovered acid separated from the partly polymerized and partly liberated butenes had its titratable acidity increased to near the proper original catalyst strength of about 65%, requiring addition of little makeup acid for reuse in the process.

It is to be noted that the treatment of the spent acid catalyst to partially liberate and partially polymerize the butenes remaining therein after separation of the primary polymer product satisfactorily removes such residual olefins, thus eliminating the necessity of the more complicated and wasteful reclaiming procedures.

Although the invention has been described with reference to a preferred mode of procedure, it is to be understood that modifications come within the spirit and scope of the invention as defined in the appended claims.

I claim:

1. Improved polymerization process which comprises introducing a feed stream which comprises normally gaseous olefins into an initial polymerization zone, contacting said normally gaseous olefins in said initial polymerization zone with sulfuric acid having a concentration in the range of about 55 to 70% under polymerization temperatures and pressures, separating a resulting liquid polymer phase from said sulfuric acid, removing the sulfuric acid containing dissolved non-polymerized olefins from the initial polymerization zone, heating the separated sulfuric acid in the absence of open steam in a secondary zone under higher temperature and lower pressure conditions whereby a second liquid polymer phase and a sulfuric acid phase having a concentration substantially equivalent to the strength of the acid utilized in said initial polymerization zone forms, withdrawing the acid phase and recycling it to said initial polymerization zone.

2. Process as defined by claim 1 wherein said normally gaseous olefins comprise olefins containing from 3 to 5 carbon atoms in the molecule; wherein the pressure in said initial polymerization zone is in the range from 40 pounds to about 250 pounds per square inch and wherein the temperature in said secondary zone is in the range from about 100° F. to 190° F. and the pressure in said secondary zone is in the range from about 0 to about 15 pounds per square inch absolute.

ROBERT V. J. McGEE.

REFERENCES CITED

The following references are of record in the file of this patent:

UNITED STATES PATENTS

| Number | Name | Date |
| --- | --- | --- |
| 2,173,452 | Merley | Sept. 19, 1939 |
| 2,379,823 | Mottern | July 3, 1945 |
| 2,388,971 | Hibshman et al. | Nov. 13, 1945 |